United States Patent
Yoo et al.

(10) Patent No.: US 9,344,282 B2
(45) Date of Patent: May 17, 2016

(54) CENTRAL AND IMPLICIT CERTIFICATE MANAGEMENT

(75) Inventors: Won Yoo, Redmond, WA (US); Carlos Aguilar Mares, Redmond, WA (US); Wade Hilmo, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 13/069,032

(22) Filed: Mar. 22, 2011

(65) Prior Publication Data

US 2012/0246475 A1 Sep. 27, 2012

(51) Int. Cl.
*H04L 9/32* (2006.01)

(52) U.S. Cl.
CPC .............. *H04L 9/3268* (2013.01); *H04L 9/321* (2013.01)

(58) Field of Classification Search
CPC . H04L 63/08; H04L 63/0807; H04L 63/0823; H04L 63/0428; H04L 9/08; H04L 9/3294; G06F 21/33
See application file for complete search history.

(56) References Cited

U.S. PATENT DOCUMENTS

| | | | | |
|---|---|---|---|---|
| 6,233,341 | B1 * | 5/2001 | Riggins | 380/277 |
| 6,802,004 | B1 * | 10/2004 | Gross et al. | 713/176 |
| 6,823,454 | B1 * | 11/2004 | Hind et al. | 713/168 |
| 7,986,688 | B2 * | 7/2011 | Larson | 370/389 |
| 8,055,780 | B2 * | 11/2011 | Deishi | 709/229 |
| 8,099,598 | B1 * | 1/2012 | Liu | 713/170 |
| 8,171,085 | B1 * | 5/2012 | Tevanian, Jr. | 709/206 |
| 8,364,756 | B1 * | 1/2013 | Modadugu et al. | 709/203 |
| 8,484,713 | B1 * | 7/2013 | Ravishankar et al. | 726/9 |
| 2003/0037234 | A1 * | 2/2003 | Fu et al. | 713/158 |
| 2004/0030887 | A1 * | 2/2004 | Harrisville-Wolff et al. | 713/155 |
| 2004/0064691 | A1 * | 4/2004 | Lu et al. | 713/158 |
| 2005/0111384 | A1 * | 5/2005 | Ishihara et al. | 370/254 |
| 2005/0228998 | A1 * | 10/2005 | Chan et al. | 713/175 |
| 2006/0005239 | A1 * | 1/2006 | Mondri et al. | 726/13 |
| 2006/0047951 | A1 * | 3/2006 | Reilly et al. | 713/158 |
| 2006/0143700 | A1 * | 6/2006 | Herrmann | 726/14 |
| 2006/0212697 | A1 * | 9/2006 | Sato et al. | 713/150 |
| 2008/0263215 | A1 * | 10/2008 | Schnellbaecher | 709/229 |
| 2009/0083537 | A1 * | 3/2009 | Larsen et al. | 713/153 |
| 2011/0016312 | A1 * | 1/2011 | Iwanski et al. | 713/156 |
| 2011/0022838 | A1 * | 1/2011 | Shaikh | 713/156 |
| 2011/0185171 | A1 * | 7/2011 | Karasawa et al. | 713/156 |
| 2011/0213965 | A1 * | 9/2011 | Fu et al. | 713/158 |
| 2012/0124384 | A1 * | 5/2012 | Livni et al. | 713/178 |
| 2014/0244998 | A1 * | 8/2014 | Amenedo et al. | 713/156 |

OTHER PUBLICATIONS

Fischer,Thorsten, "Supporting virtual servers with Server Name Indication", Retrieved at <<http://www.linux-magazine.com/w3/issue/92/072-074_SNI.pdf>>,Issue 92, Jul. 2008, pp. 72-74.

(Continued)

*Primary Examiner* — Ali Abyaneh
(74) *Attorney, Agent, or Firm* — Kevin Sullivan; Kate Drakos; Micky Minhas

(57) ABSTRACT

Facilitating management of digital certificates is addressed. More specifically, digital certificates as well as public and private keys can be stored in a centrally accessible location and dynamically acquired from the location as needed. Additionally, binding of digital certificates and associated keys can be implicit and determined as a function of a host name provided during protocol negotiation, for example.

19 Claims, 9 Drawing Sheets

(56) References Cited

OTHER PUBLICATIONS

"Configuring HTTPS servers", Retrieved at <<http://nginx.org/en/docs/http/configuring_https_servers.html#sni>>, Retrieved Date: Dec. 23, 2010, pp. 5.

Singh, et al., "Centralizing the Management of SSL Infrastructures", Retrieved at<<http://ftp.dell.com/app/2q02-Sin.pdf>>, May 2002, pp. 4.

"10 Tips for Managing Multiple Servers", Retrieved at<< http://www.verisign.com/ssl/ssl-information-center/managing-multiple-servers/index.html>>, Retrieved Date: Dec. 23, 2010, pp. 2.

"GNUTLS", Retrieved at <<http://www.gnu.org/software/gnutls/manual/gnutls/gnutls.html#SECTION00462000000000000000>>, Retrieved Date: Dec. 23, 2010, pp. 111.

"Cookbook: SSL, TLS and certificates", Retrieved at<<http://www.cherokee-project.com/doc/cookbook_ssl.html>>, Retrieved Date: Dec. 23, 2010, pp. 5.

Waldner, Name-based SSL virtual hosts in Apache, Retrieved at<<http://backreference.org/2009/12/17/name-based-ssl-virtual-hosts-in-apache/>>, Dec. 17, 2009, pp. 9.

* cited by examiner

CENTRAL AND IMPLICIT CERTIFICATE MANAGEMENT

BACKGROUND

In certain instances, it is desirable to employ secure network communications. Consider web browsing, for example, and more specifically, instances where sensitive information, such as credit card information, is transmitted from a client (e.g., web browser) to a server (e.g., web server), for instance on e-commerce websites. In such cases, a secure communication channel between the client and the server can be established to prevent electronic eavesdropping, among other things. Typically, a protocol such as secured sockets layer (SSL) or transport layer security (TLS) can be employed along with a digital certificate to secure communications.

The SSL, or its decedent TLS, protocol can establish a secure connection beginning with a handshake procedure in which a client and server, for example, negotiate and agree upon various parameters used to secure the connection. The handshake procedure, or negotiation, begins when a client connects to a server requesting a secure connection and provides a list of supported cipher suites (e.g., set of authentication, encryption, and message authentication algorithms). The server selects one of the cipher suites and notifies the client of the selection. In addition, the server sends back identification information in the form of digital certificate that includes the server name, a certificate authority signature, and the server's public encryption key. After confirming the certificate is valid, the client can generate a pseudo-random number, encrypt the number with the server's public key, and send the encrypted number to the server. Upon receipt, the server can decrypt the transmitted number utilizing its private key. From this number, a session key can be generated for encryption and decryption. Subsequently, the client and server can exchange data over the established secured channel in which messages are encrypted utilizing the session key.

Prior to establishing a secure connection, a server needs to acquire and bind a digital certificate. More specifically, a trusted certificate authority (CA) is contacted and provided requisite information. Upon verification of provided information, the certificate authority will issue a certificate including the server's name, public key, and expiration date, among other things. Subsequently, the server will copy the certificate, import the certificate into a local repository, and explicitly bind the certificate to an IP (Internet Protocol) address and port combination, or more simply to a host, such as a website.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to central and implicit certificate management. Digital certificates as well as associated public and private keys can be stored on, and dynamically acquired from, a centrally accessible store. Furthermore, binding of digital certificates and related keys can be implicit based on a value provided during a protocol handshake, or negotiation, such as a host name, for example. Various optimizations can also be employed including but not limited to caching of acquired digital certificates and keys.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Conventionally, certificates reside locally on a server, for example, and require an explicit binding to a host (e.g., network-connected computer or portion thereof that supplies data). As a result, manageability in particular scenarios can be a daunting task. By way of example, and not limitation, consider virtual hosting, or more specifically shared web hosting, wherein website hosters offer an inexpensive hosting solution by allowing multiple websites, typically hundreds, if not thousands, to share resources of a machine, such as a server. In other words, the cost of running a server is divided amongst many websites. Assume a hoster has two-thousand websites that share a single server and there are hundreds of servers. If a number of those websites desire secure communication, conventionally a certificate needs to be obtained, copied to a particular server, imported into a repository, and explicitly bound for each of potentially thousands of host websites, which can be quite time consuming. Furthermore, when certificates expire, the process needs to be repeated with respect to a new or renewed certificate.

Details below are generally directed toward central and implicit certificate management to lower the cost of manageability in situations as described above, among others. More specifically, digital certificates, as well as corresponding public and private keys, can reside in a central store as opposed to being locally persisted to a particular server, for example. As a result, a server can acquire certificates on demand or, in other words, as needed. In addition, digital certificates and associated keys can be locally cached to improve response time and efficiency by limiting remote calls to a central store. Furthermore, associations between hosts and certificates can be managed implicitly, for example by automatically determining or inferring a binding as a function of a host name and a certificate naming convention. Consequently, management challenges associated with at least conventional local certificate storage and explicit bindings are addressed.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
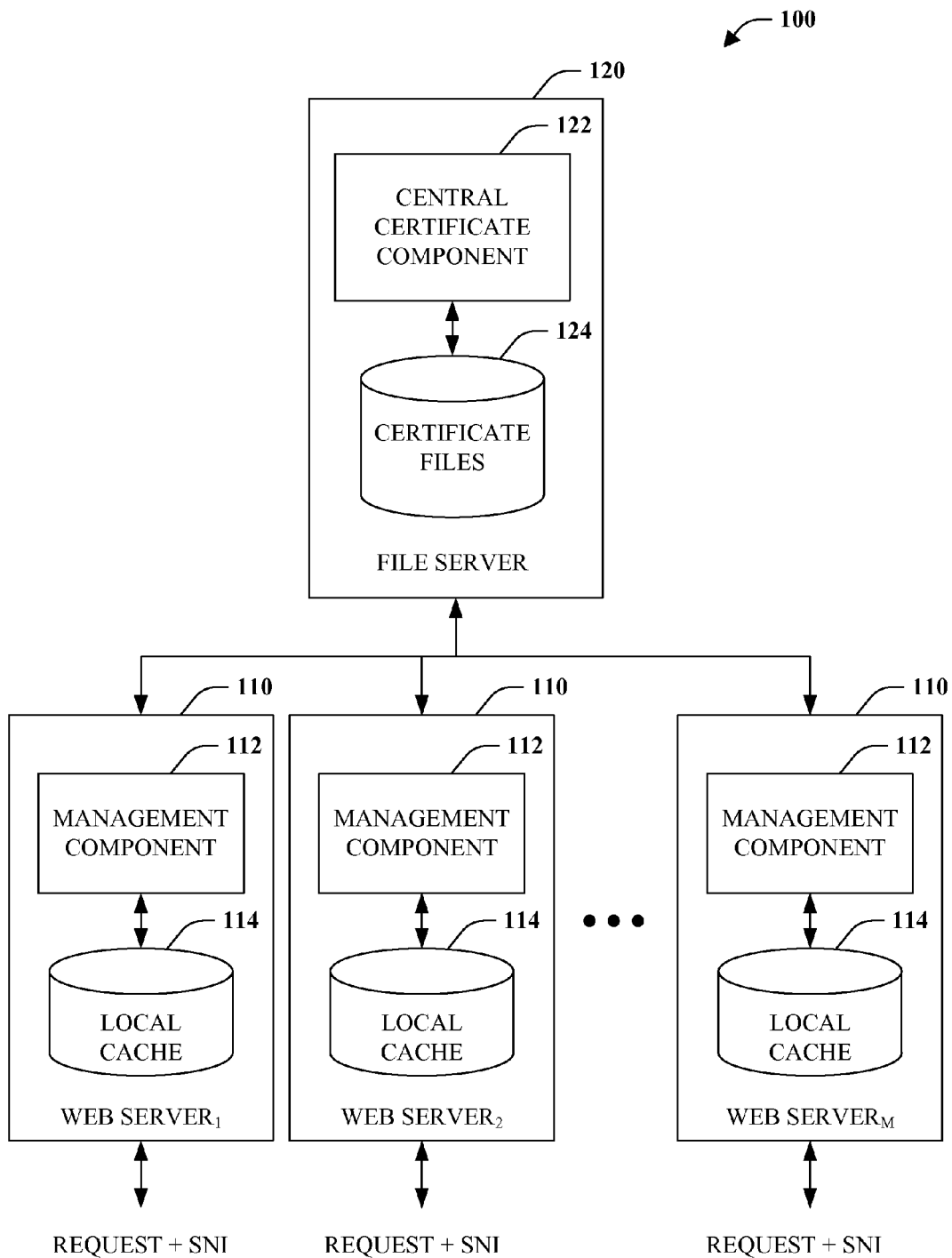
FIG. 1 is a block diagram of a system that facilitates certificate management.

Referring initially to FIG. 1, a system 100 that facilitates certificate management is illustrated. The system 100 includes a plurality of web servers 110 communicatively coupled to a file server 120 that enables central certificate management.

The web servers 110 (WEB SERVER$_1$-WEB SERVER$_M$, where "M" is a positive integer) include management component 112 and local cache 114. The management component 112 is configured to manage certificates, or certificate files (e.g., .pfx—personal information exchange syntax standard) that can include a digital certificate (e.g., SSL certificate), a public key, and/or a corresponding private key, for one or more hosted websites. Additionally, the management component 112 is configured to cache and update certificates with respect to the local cache 114, among other things.

The file server 120 is a centrally accessible store that includes central certificate component 122, and a number of certificate files 124. A certificate file (e.g., .pfx) is a collection of data that can include a digital certificate, a public key, and/or a private key. The central certificate component 122 is configured to enable secure access to the certificate files 124 as well as notify the web servers 110 upon a change in certificate files, as described further below.

When a web server 110 receives a request from a client for a secure connection to a webpage (e.g., https:// . . . ), the management component 112 can dynamically request a certificate file from the file server 120. In response, the file server 120 can provide, or otherwise make accessible, the requested certificate file for use in establishing and employing a secure connection. The management component 112 can also be configured to, among other things, save an acquired file to the local cache to avoid costs involved with a remote call to the file server 120 and enable expeditious access to the file. Such centralized provisioning of, and access to, certificate files substantially eliminates the work of copying and importing certificates individually on each web server as is the convention.

Furthermore, the system 100, and more specifically the management component 112, can utilize implicit rather than explicit binding of hosts (e.g., web server, virtual web server . . . ) to certificates or certificate files. Conventionally, the bindings, or usage of certificates, are required to be specified explicitly one at a time by an information technology (IT) professional, such as an administrator. This is inefficient. Further, in high density and scale deployment such as shared web hosting, this technique could result in hundreds, if not thousands, of individual bindings being managed one at a time. Here, bindings can be determined or inferred automatically, for example utilizing information provided during negotiation of secure communication, among other things.

In accordance with an aspect of the disclosure, host name, domain name, or like identifier can be communicated as part of a communication-channel negotiation protocol and employed to bind hosts to certificates. For instance, a server name indication (SNI) as well as a naming convention based thereon can be utilized to facilitate implicit binding. For example, a certificate file can be named "<host name>.pfx." Upon receipt of a host name along with a request for secure communication from a client a web server 110, the host name, "ABC," for example, can be automatically bound to a certificate file named "ABC.pfx," for instance. Among other things, implicit binding relieves an information technology professional from the burden of explicit binding especially in high density and high scale deployments where there are thousands of certificates to manage.

Figure 2:
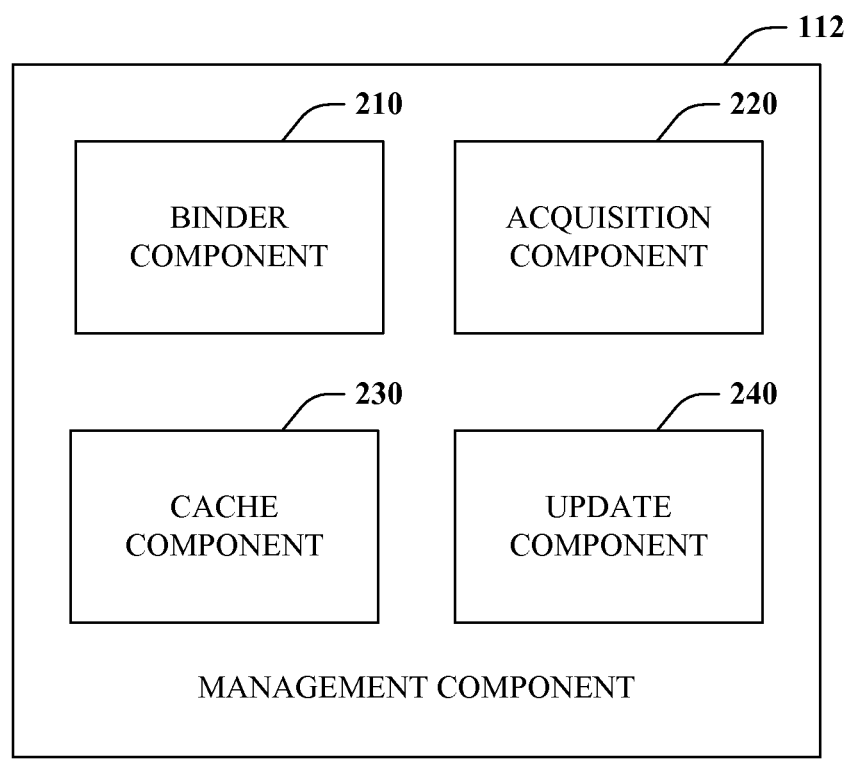
FIG. 2 is a block diagram of a representative management component.

FIG. 2 depicts a representative management component 112 including binder component 210, acquisition component 220, cache component 230, and update component 240. The binder component 210 is configured to bind a certificate file or portion thereof to a host, or, in other words, network connected computer or portion thereof that supplies data such as a website. As mentioned previously, in one embodiment, a host name provided as part of a secure communication negotiation can be bound to a certificate file or portion thereof based on a naming convention. In some instances, an exact name match can be sought for binding. For example, if a host name, or more specifically, a domain name, is "www.foobar.com," the file name "www.foobar.com.pfx," corresponding to the certificate file, can be sought. Alternatively, partial matches can be employed, since sometimes wildcard certificates are issued for a domain such as "*.foobar.com" to cover such domains as "images.foobar.com" or "audio.foobar.com," for instance. Accordingly, based on the naming convention, the binder component 210 can look for a file named "*.foobar.com.pfx" (or where "*" is not supported another character can be used as the wildcard such as "_"). If "*.foobar.com.pfx" does not exist, the wildcard can be extended further to "*.pfx," for example.

Additionally, in an embodiment where the naming convention/contract is based solely on the file name, if there are multiple alternate names that are associated with a single certificate file, then the file can be copied with different names. For example consider a situation where there is a certificate file with a name "www.foo.com" and "www.bar.com." In other words, the same certificate is used for "www.foo.com" and "www.bar.com." Here, a copy of the certificate can be saved with two different names—"www.foo.com.pfx" and "www.bar.com.pfx"—to enable matching by the binder component 210.

Further yet, that various identifiers can be utilized as the naming convention. For example, international domain names (IDN), which use international characters and are Punycode encoded, can be employed as the naming convention. In other words, file names can be further encoded so that the naming convention allows implicit matching of an international domain name to a corresponding certificate file.

The acquisition component 220 is configured to acquire a certificate file, or portions thereof. In one embodiment, the acquisition component 220 can acquire the certificate file from a centrally accessible store such as the file server 120 of FIG. 1. Additionally, the acquisition component 220 can acquire the certificate file from local cache 114. For example, the acquisition component 220 can first check the local cache 114 for the file and, if not present, request the file remotely from the file server 120.

The acquisition component 220 can also be configured to employ secure credentials to enable acquisition of certificate files (e.g., impersonation). Certificates and private keys by nature are stored in a secure manner to prevent access by unauthorized users. For example, a central, network-accessible, certificate-file store can employ an access control list (ACL). The acquisition component 220 can be configured to impersonate the identity of a user/system with access rights to acquire (e.g. retrieve, read . . . ) a certificate file successfully.

The cache component 230 is configured to manage the contents of a local cache 114. In one instance, the cache component can assist in interacting with the local cache 114, for example to store or read values. Moreover, the cache component 230 can be configured to employ intelligent caching techniques to minimize the cost associated with acquiring a certificate file remotely. For instance, various predictive caching and prefetching can be employed, amongst other known caching techniques. Furthermore, the cache component 230 can maintain set of identifiers such as file names in a list or other data structure that identify certificate files residing on a central store.

Figure 3:
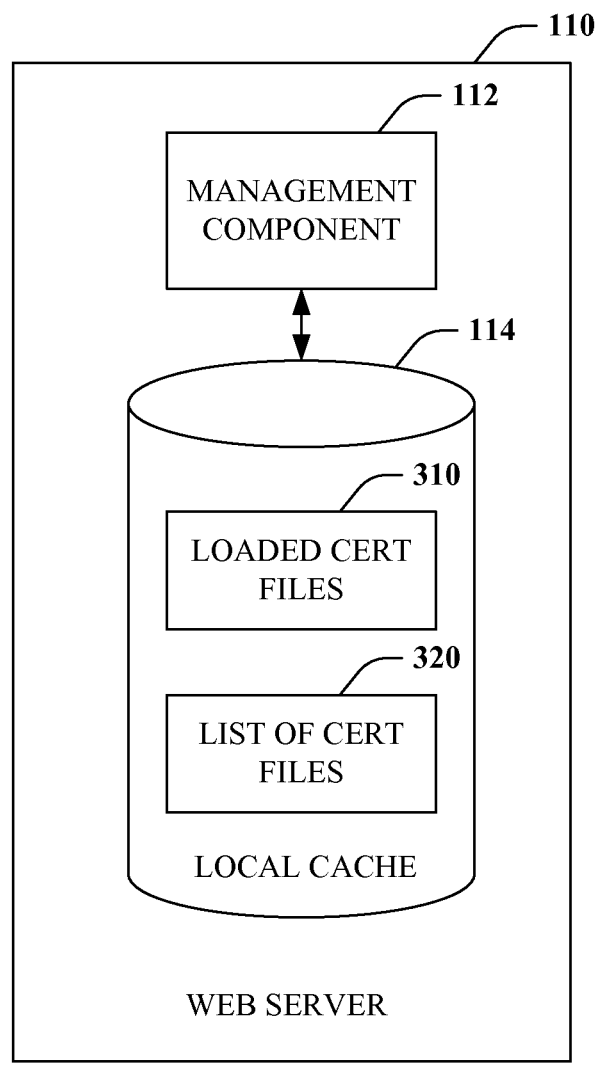
FIG. 3 is a block diagram of a representative web server.

Turning attention briefly to FIG. 3, a representative web server 110 is illustrated including the management component 112 and local cache 114 as previously described with respect to FIGS. 1 and 2. Furthermore, the local cache 114 can included loaded certificate files 310 and a list of certificate files 320. The loaded certificate files 320 pertain to certificate files that were acquired from a centrally accessible store and loaded into local cache 114 for current and future utilization. The list of certificate files 320 provides information about certificate files that are available on the centrally accessible store, for instance in the form of a list of files. These files are resident on the centrally accessible store and not loaded locally but merely identified. In this manner, the management component 112, and more particularly the binder component 210, can bind, or match, a host with a certificate file in memory prior to performing a remote access call. This has several benefits. One is that a performance-expensive remote-access call is made after it is confirmed that the file exists on the centrally accessible store. In addition, whether there is an exact match, partial match, or wild card match, the expensive remote-access call is made once. Still further, because the need for making remote-access calls is reduced, it further protects the system from potential denial of service (DOS) attacks where malicious clients send requests with additional host names in an attempt to overload the system.

Returning to FIG. 2, the management component 112 can cache certificate files to avoid expensive network round trips to a centrally accessible store, among other things. However, to further complicate the manageability of certificates, the certificates expire after a year (or other period depending on a certificate authority) and bindings should be kept up-to-date, as the certificates expire. The update component 240 is configured to keep cached versions of certificate files, including certificates, public keys, and private keys, current in view of what can seem like randomly expiring certificates absent extensive tracking. In accordance with one embodiment, the update component 240 can receive a notification (a.k.a., change notification) from a central certificate store that a certificate file has changed. Subsequently, the update component 240 can initiate removal of a currently cached certificate file and addition of a new certificate file by way of the acquisition component 220, for instance. In other words, the old certificate file can be overwritten by the new certificate file. If the file was not cached, the updated can be automatically propagated later upon retrieval of the updated file from the central store. Various other embodiments of the update component 240 are contemplated including but not limited to actively monitoring a central store for changes to cached certificates.

Aspects of the subject disclosure have been described with respect to a file server and various web servers, but such aspects are not limited thereto. Any centrally accessible storage mechanism can be employed to house and provision certificate files as described with respect to a file server. For example, a database or caching mechanism can provide such functionality. Any server, or the like, that utilizes digital certificates can employ the functionality described with respect to web servers herein. For instance, a mail server, proxy server, or FTP server, among others can utilize such functionality. Still further yet it should be appreciated that a server can refer to hardware, software, or a combination of hardware and software.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the management component 112 can employ such mechanisms to bind certificate files implicitly or predicatively cache certificate files.

In view of the exemplary systems described supra, methodologies that may be implemented in accordance with the disclosed subject matter will be better appreciated with reference to the flow charts of FIGS. 4-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 4:
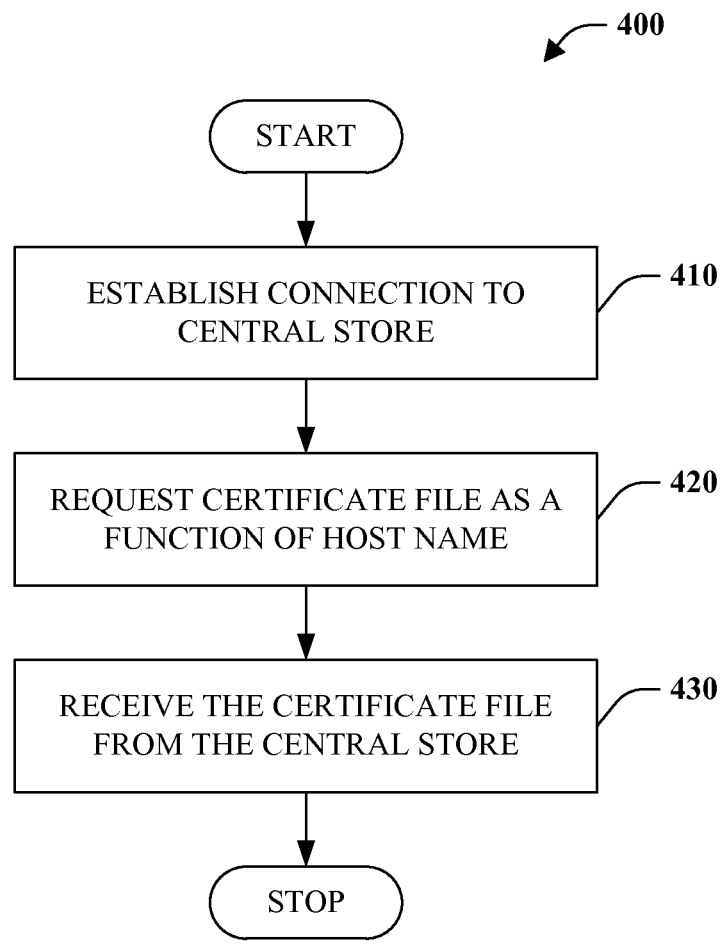
FIG. 4 is a flow chart diagram of a method of facilitating certificate management.

Referring to FIG. 4, a method 400 of facilitating certificate management is illustrated. At reference numeral 410, a connection is established with a central store that includes certificate files including digital certificates, public keys, or private keys. In one instance, establishing such a connection may necessitate impersonation of user rights to successful connect since the store can include security mechanism to protect its contents. At numeral 420, a request is directed to the central store for a certificate file, wherein the certificate file name is specified as a function of a host name identifying a host (e.g., network connected computer or portion thereof that supplies data). For example, the host name can be a domain name such as "www.foo.com." At reference numeral 430, a certificate file, for example www.foo.com.pfx" based on a naming convention, is received from the central store in response to the request.

Figure 5:
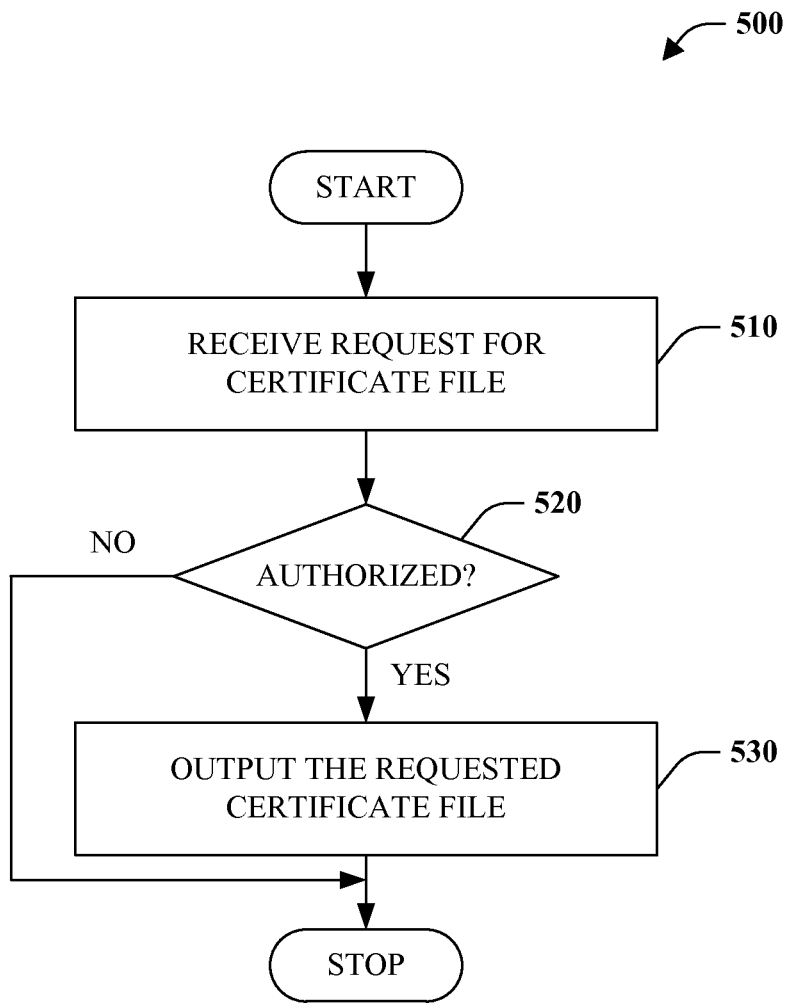
FIG. 5 is a flow chart diagram of a method of provisioning certificate files.

FIG. 5 is a flow chart diagram of a method 500 of provisioning certificate files. At reference numeral 510, a request is received for a certificate file (e.g., .pfx) comprising a digital certificate, public key, or private key. At numeral 520, a determination is made as to whether the requester is authorized to interact with the system and receive a response to the request. For example, an access control list (ACL) can be employed, wherein a table identifies rights of particular users with respect to specific files. If access is not authorized ("NO"), the method 500 terminates. Otherwise ("YES"), at numeral 530, the requested certificate file is output to the requester.

Figure 6:
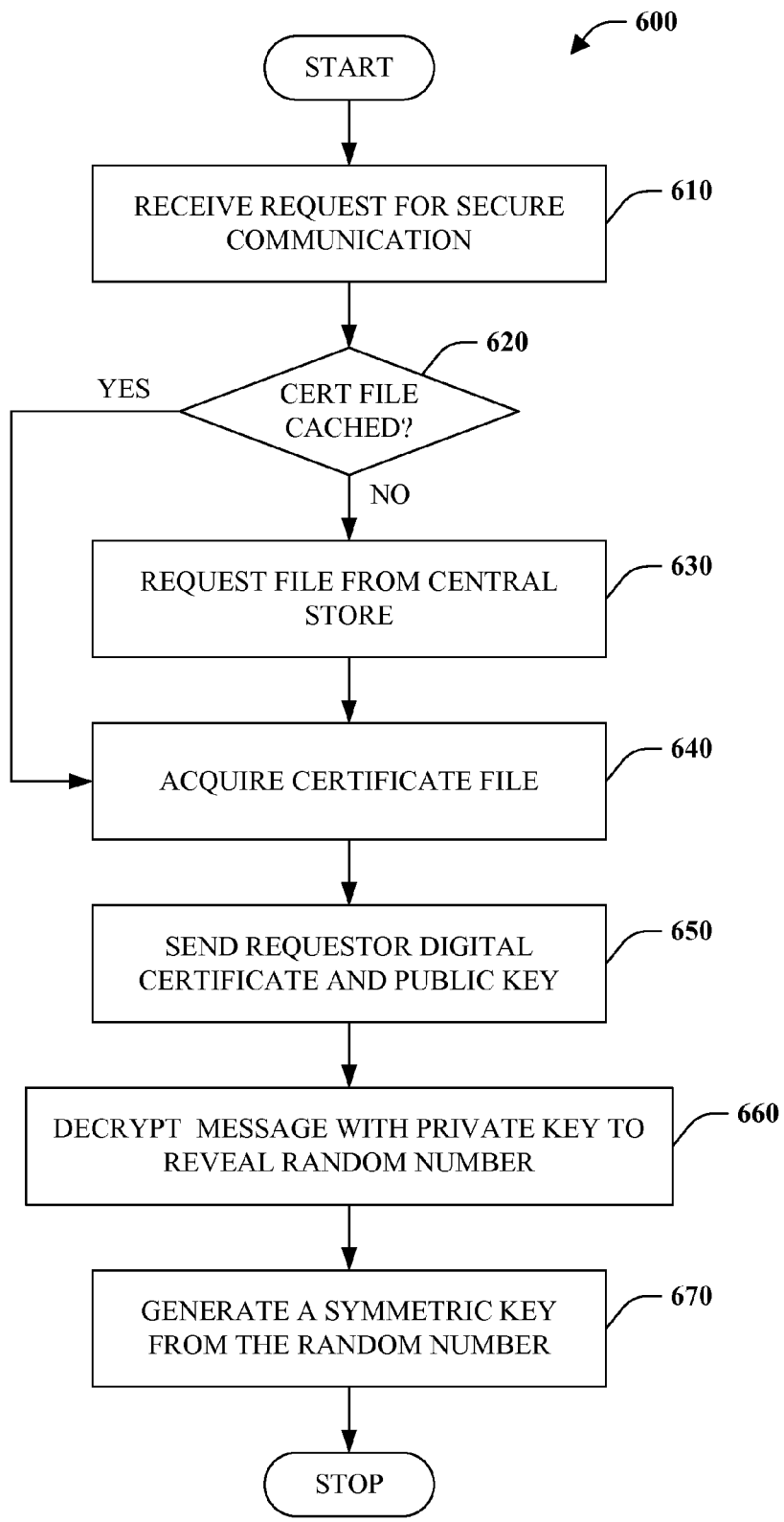
FIG. 6 is a flow chart diagram of a method of negotiating secure communication.

FIG. 6 depicts a method 600 of negotiating secure communication. At reference numeral 610, a request for secure communication is received. For example, a banking website can receive a request for secure communication from a client. At numeral 620, a determination is made as to whether a certificate file including a digital certificate, public key, or private key is locally cached. If the file is not cached ("NO"), at numeral 630, the file is requested from a central store and subsequently acquired from the store, at 640. Alternatively, if the certificate file is cached ("YES"), the file can be acquired at numeral 640 without incurring the expense of requesting the file from the central store. At reference numeral 650, the requestor, or client, requesting a secure communication is sent a digital certificate and public key, or in other words, a certified public key, acquired from the certificate file. At numeral 660, a return message from the requestor is decrypted with the private key acquired from the certificate file, corresponding to the public key, to reveal a random or pseudo-random number. At reference numeral 670, a symmetric key is generated from the random number that can be utilized to secure communication between parties by way of symmetric encryption with the symmetric key.

Figure 7:
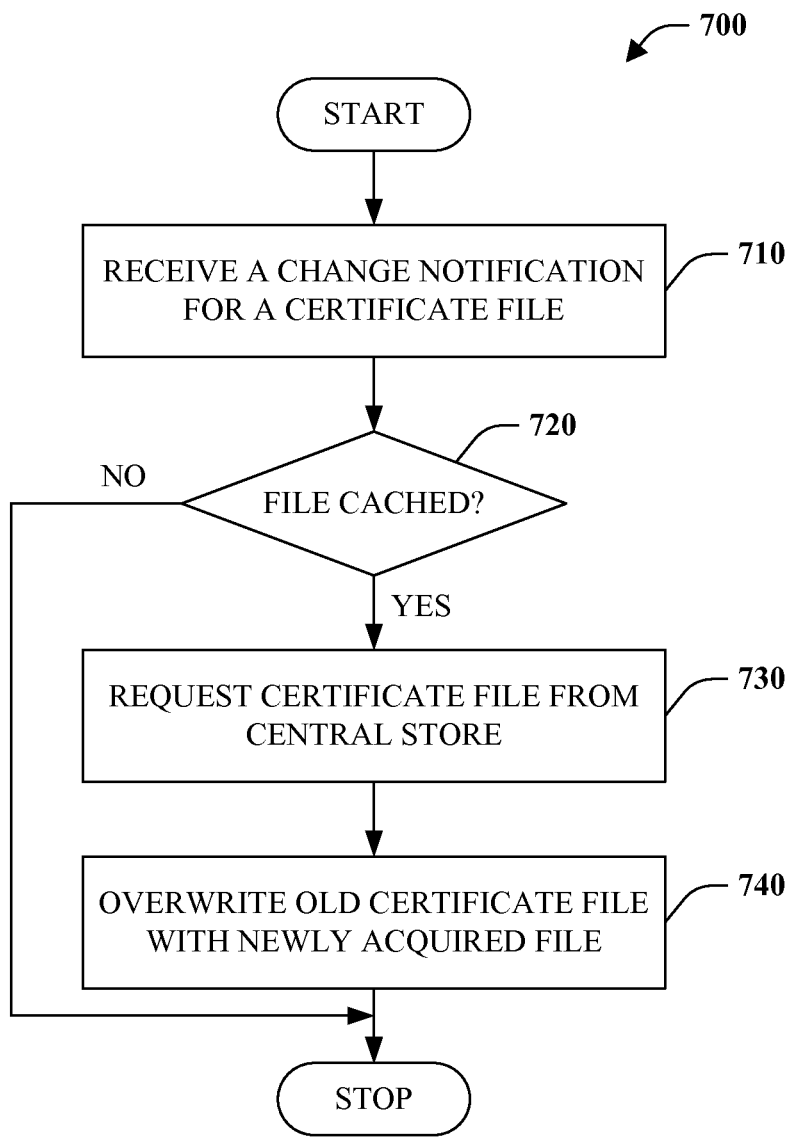
FIG. 7 is a flow chart diagram of a method of managing certificate files.

FIG. 7 is a flow chart diagram illustrating a method 700 of managing certificate files. At reference numeral 710, a change notification is received for a certificate file including a digital certificate, public key, and private key. The notification can be provided from a central store that persists a plurality of certificate files. At numeral 720, a determination is made as to whether the file is currently locally cached. If the file is not cached ("NO"), the method 700 terminates. If the file is cached ("YES"), the method 700 continues at 730 where the changed certificate file is requested from a central store, such as a file server. The old certificate file is subsequently overwritten, or replaced, with the newly acquired certificate file at reference numeral 740. As a result, the certificate file is current and reflects changes made to the certificate file at the central store.

Figure 8:
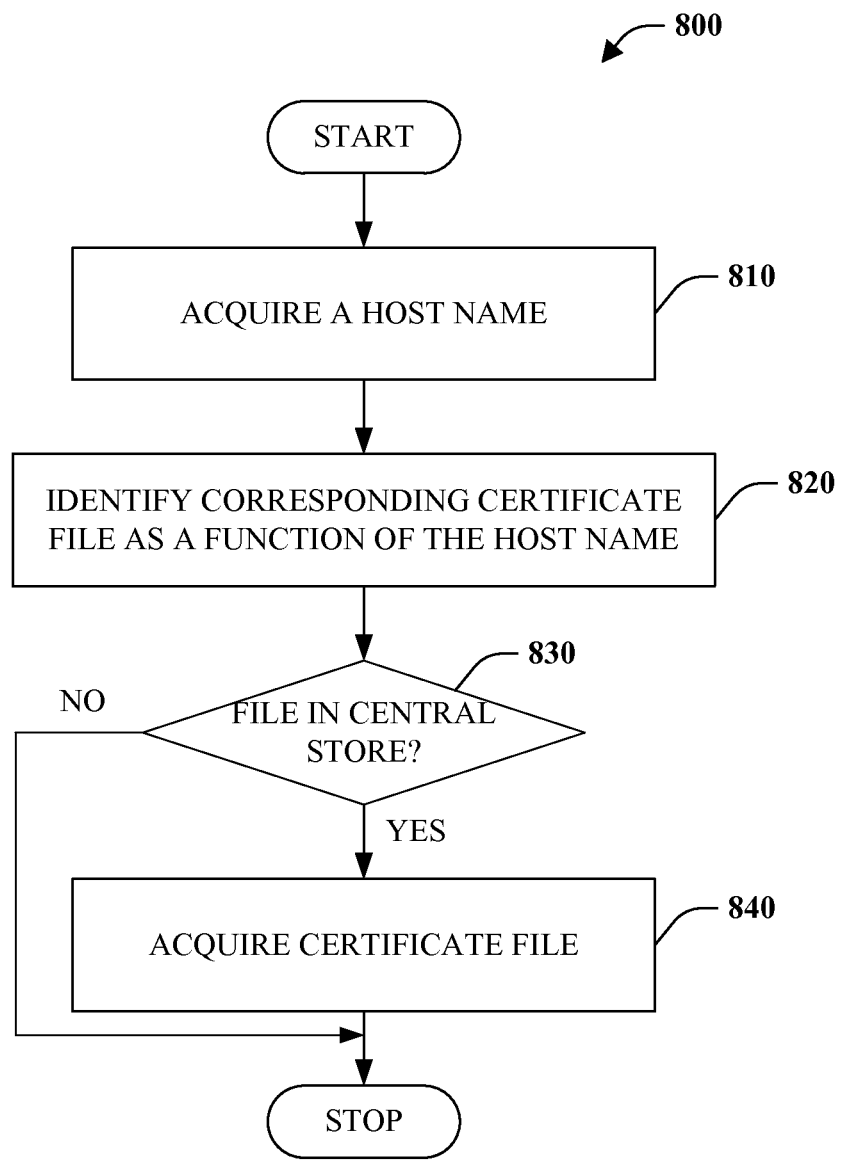
FIG. 8 is a flow chart diagram of a method of acquiring a certificate file or portion thereof.

FIG. 8 is a flow chart diagram of a method 800 of acquiring a certificate file or portion thereof. At reference numeral 810, a host name is acquired, for example as part of a request for secure communication with a host. At numeral 820, a corresponding certificate file including a digital certificate, public key, or private key can be identified as a function of the host name. At 830, a determination is made as to whether the identified file is in a central store. In accordance with one embodiment, such a determination can be made by querying or attempting to read the identified file from the central store. Additionally or alternatively, the determination can be made by referring to a set of locally cached file names indicative of the files resident on a central store. If, at 830, the file is in the central store ("YES"), the certificate file can be acquired at reference numeral 840. If, at 830, it is determined that the file is not in the central store ("NO"), the method 800 can terminate.

As an alternative to simple termination, however, it is to be appreciated that the format of the certificate file name can be altered by adding a wild card, for instance, and re-tested to determine presence in the central store (not shown). By way of example, and not limitation, suppose the host name is "images.foo.com." Based on a naming convention, an exact match can be sought initially, namely "images.foo.com.pfx." If an exact match is not detected, a partial match can be attempted utilizing a wild card, for instance "*.foo.com.pfx." If there is still no match, the wildcard can be extended further to "*.pfx," for example.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
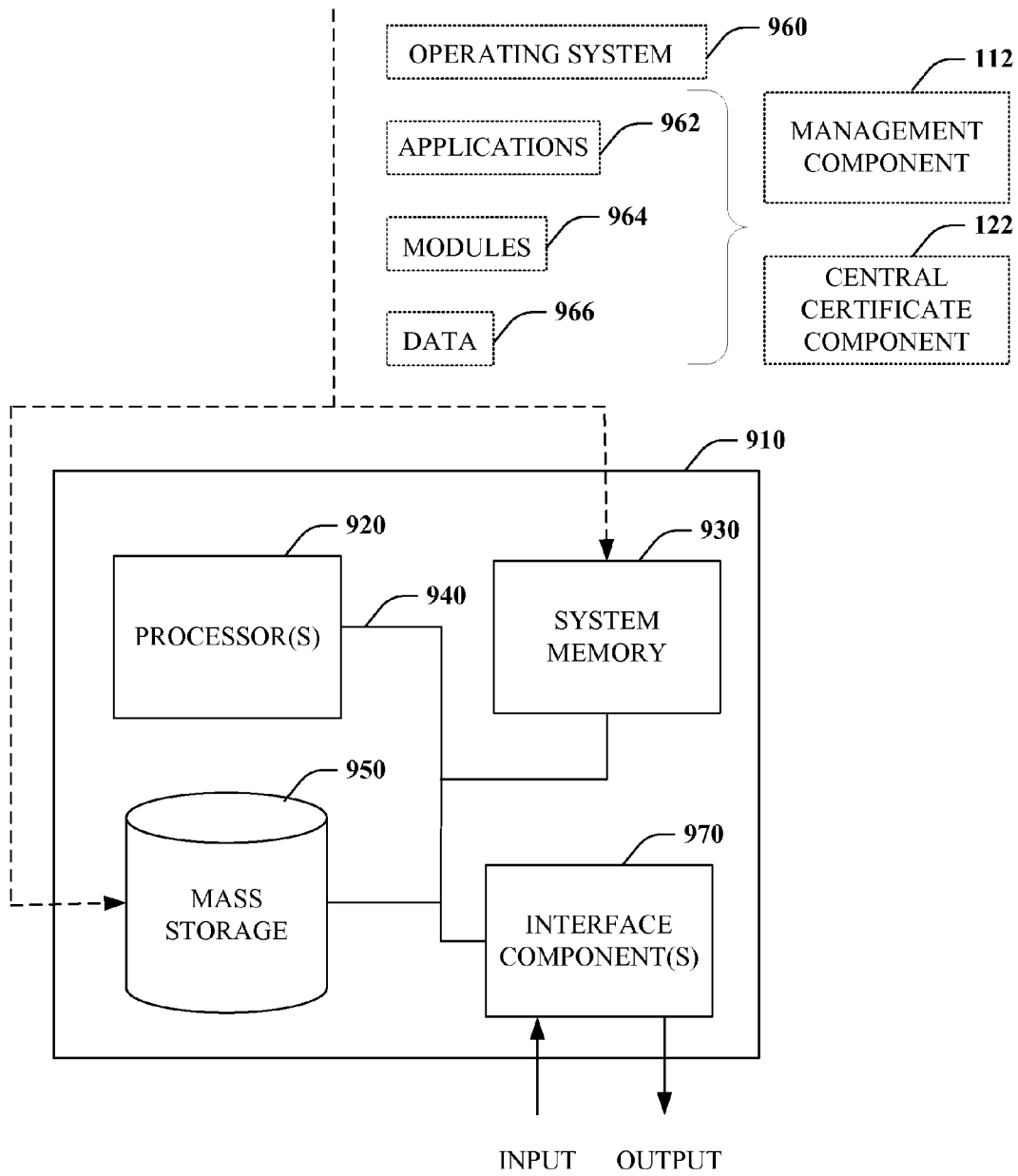
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, management component 112 and the central certificate component 122, or portions thereof, can be, or form part, of an application 962, and include one or more modules 964 and data 966 stored in memory and/or mass storage 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the management component 112 and the central certificate component 122 and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims

What is claimed is:

1. A method of facilitating certificate management, comprising:
   employing at least one processor configured to execute computer-executable instructions stored in memory to perform the following acts:
   receiving a request, including a host name, for secure communication from a client;
   determining a digital certificate name based at least on the host name and a digital certificate naming convention;
   confirming that a digital certificate exists on a network-accessible central store by comparing the digital certificate name with a set of one or more digital certificate names stored locally on a server;
   acquiring the digital certificate from the network-accessible central store; and
   returning the digital certificate to the client in response to the request.

2. The method of claim 1 further comprising acquiring the host name from a communication-channel negotiation protocol.

3. The method of claim 1 further comprising storing a local copy of the digital certificate on the server.

4. The method of claim 3 further comprising writing over the local copy of the digital certificate on the server with an updated digital certificate.

5. The method of claim 4, writing over the local copy in response to a change notification from the network-accessible central store.

6. The method of claim 1 further comprising binding a private key corresponding to the digital certificate to the server implicitly as a function of the host name.

7. The method of claim 6 further comprising acquiring the private key from the network-accessible central store.

8. The method of claim 1 further comprises:
   receiving a message encrypted with a public key associated with the digital certificate;
   decrypting the message with a private key associated with the digital certificate to reveal a number; and
   generating a symmetric key from the number.

9. The method of claim 8 further comprises securely communicating with the client with symmetric encryption using the symmetric key.

10. A system configured to facilitate certificate management, comprising:
    a processor coupled to a memory, the processor configured to execute the following computer-executable components stored in the memory:
    a first component configured to determine a digital certificate name based on a host name received with a request for secure communication and a naming convention;
    a second component configured to acquire a digital certificate from a network-accessible central store automatically after confirming the digital certificate exists on the network-accessible central store by comparison of the digital certificate name with a set of one or more names stored locally on a server; and
    a third component configured to return the digital certificate in response to the request.

11. The system of claim 10, further comprises a fourth component configured to save the digital certificate in a local cache of the server.

12. The system of claim 11 further comprises a fifth component configured to initiate replacement of the digital certificate with a new version of the digital certificate.

13. The system of claim 10, the host is a web server.

14. A computer-readable storage device having instructions stored thereon that enables at least one processor to perform a method upon execution of the instructions, the method comprising:
    identifying a file, including a digital certificate, for a web server as a function of a domain name for the web server and one or more file names stored locally on the web server indicative of one or more corresponding files stored on a network-accessible central store, the file names are based on names of domains for web servers to which the files are implicitly bound;
    requesting the file from the network-accessible central store;
    receiving the file from the network-accessible central store; and
    saving the file to a local cache on the web server.

15. The computer-readable storage device of claim 14, the method further comprising replacing the file with an updated version of the file upon notification by the network-accessible central store.

16. The computer-readable storage device of claim 14, the method further comprises acquiring the domain name from a client during negotiation of a secure communication channel.

17. The computer-readable storage device of claim 16, the method further comprises sending the file to the client.

18. The computer-readable storage device of claim 17, the method further comprises:
    receiving a message encrypted with a public key included in the file;

decrypting the message with a private key corresponding to the public key to reveal a number; and generating a symmetric key from the number.

19. The computer-readable storage device of claim 18, the method further comprises communicating with the client with symmetric encryption employing the symmetric key.

* * * * *